Sept. 22, 1970     L. WALZEL     3,529,733

STEEL MAKING PLANT

Filed Aug. 8, 1968     2 Sheets-Sheet 1

Inventor
LEOPOLD WALZEL

BY McGlew and Toren
ATTORNEYS

Sept. 22, 1970  L. WALZEL  3,529,733

STEEL MAKING PLANT

Filed Aug. 8, 1968  2 Sheets-Sheet 2

Inventor
LEOPOLD WALZEL

BY McGlew and Toren
ATTORNEYS

United States Patent Office 3,529,733
Patented Sept. 22, 1970

3,529,733
STEEL MAKING PLANT
Leopold Walzel, Duisburg, Germany, assignor to Demag Aktiengesellschaft, Duisburg, Germany
Filed Aug. 8, 1968, Ser. No. 751,257
Claims priority, application Germany, Sept. 1, 1967, 1,583,236
Int. Cl. C21c 5/28, 5/44
U.S. Cl. 214—18
6 Claims

ABSTRACT OF THE DISCLOSURE

A steel making plant includes a furnace hall separated by a wall from a scrap depot. A row of furnaces extends along the wall with the charging sides of the furnaces facing toward the scrap depot. The wall is formed with an opening therethrough substantially co-extensive in length with a row of furnaces. A crane is mounted on rails to move longitudinally of this opening and extends into both the furnace hall and the scrap depot. Trolleys are movable along the crane to pick up charging boxes, filled with scrap, from the scrap depot, and to move the boxes through the opening in the wall to discharge the scrap into respective furnaces. The crane may mount two or more trolleys with the scrap charging boxes being movable through openings in the crane.

BACKGROUND OF THE INVENTION

In the present state of steel making technology, voluminous devices for bringing the scrap from a scrap depot to a furnace are known. Depending on a given condition in an individual steel plant, the required solutions must take into account all factors involved. The furnaces must be arranged not only in operative relation with the conveyor means for the charging material but also in operative relation with the conveying means for the material tapped from the furnace. The latter takes precedence for metallurgical reasons. However, the most prime necessity is that of using as little space and area as possible, this being for reasons of economy. The question of space has thus become an urgent problem in all steel plants, with the objective being to bring the materials from the scrap depot to the processing area along the shortest possible path of travel.

In the past, various types of scrap box conveying arrangements have been used. For example, the charging boxes are filled at the scrap depot by a hoist, a magnet, and the like. The scrap box crane then carries the filled box into the charging range of the furnaces. At this time, the scrap box conveying trolley of the crane effects emptying of the scrap into the furnace. Such a conveyance of the scrap boxes is possible only if no movements transversely of the furnace row are necessary.

However, such transverse movements must, as a rule, be accepted, and then other devices are necessary, such as scrap ferries. In such arrangements, the scrap depot crane conveys the scrap boxes only through a range in which it can place them down onto the scrap ferry. The scrap ferry brings one or more scrap boxes, depending on its capacity and size, into the furnace hall. In the furnace hall, a special crane is required to lift the scrap boxes and to discharge them, either into the furnace using its own crane trolley, or to transfer them to a special charging machine which performs the charging operations.

Recently, it has been attempted to relieve the hall crane to a greater extent from this type of work. The charging of increasingly larger furnaces, such as converters which have greatly increased in their effective volume, requires a greater conveying output of the cranes in the furnace hall.

It is true that a greater loading of the crane can be achieved easier than a reduction of the crane time, so that the tendency toward bringing a number of scrap boxes in advance into the charging range of the furnaces, by using buffer stations, generally continues. At the charging time, these buffer stations are then used for performing charging of the furnaces independently of the crane in the furnace hall. Thus, this crane is considerably relieved with respect to the demands imposed on it.

If the capacity of the buffer stations is exhausted, then the problem becomes that of a basic output of the feeder-conveyor means, which must be kept at a minimum. The minimum basic output is determined by the lengths of the paths of travel and the transfer times, as well as by the conveyor velocities.

Though the principle of scrap ferries provides a storage possibility, in addition to which a problem resulting from local conditions has been solved thereby, so that a relatively large number of large scrap boxes can be brought into the charging range, there are time losses, caused by long travel paths, occupied space, and transfer operations from the scrap depot crane to the ferry, which must be accepted as unavoidable. In addition, the scrap itself, because of its composition, frequently requires special measures. For example, it is advisable to arrange very large scrap pieces in order before they are loaded into the charging boxes, or else these large pieces must at least be arranged in order in the charging box. This requires a special station where the charging boxes must remain stationary.

The charging of scrap, involving the transfer of scrap from the scrap depot to the charging range of the furnaces, is a special problem in steel plants as far as expenditure for apparatus and the required area is concerned, as well as in terms of obtainable output and load of the particular means used. This will be readily apparent from the foregoing.

SUMMARY OF THE INVENTION

This invention relates to steel making plants and, more particularly, to an improved and simplified arrangement of a steel making plant in which scrap charging boxes are moved through a wall of a furnace hall separating a row of furnaces from a scrap depot.

The objective of the present invention is to improve the conveying of scrap from a scrap depot to a row of furnaces in a furnace hall, with better utilization of the available area as well as an increase in output. This increase in output is achieved primarily by simplification of the conveying means. Naturally, the loading and balancing of the furnace hall crane and the scrap depot crane is a special secondary problem.

In accordance with the present invention, a row of furnaces is arranged in a furnace hall, with the charging sides of the furnaces facing toward a scrap depot separated from the furnace hall by a wall. At least one track, for a crane trolley for carrying the scrap boxes, extends between the scrap depot and the furnace row through an opening in the wall of the furnace hall. This results, first of all, in a simplification of the conveying means, because the scrap depot crane is combined with the charging crane of the furnace hall, in a single crane. The crane in the furnace hall is now available to convey the hot metal ladles or to pour the latter into chilled molds, or to work on a continuous casting plant. As a scrap ferry is completely superfluous, its track can therefore be omitted. There are no transfers between the scrap depot crane, scrap ferry, or the furnace hall crane serving the row of furnaces. The savings in time increase the capacity.

In the simplest form of the invention, a scrap box suspending trolley lifts the filled scrap box only, conveys it through the opening or cutout in the wall of the furnace hall, and performs the charging operation. The invention is thus characterized by a very short movement of the scrap charging boxes, and the lifting and transverse movement thereof is followed only by tilting of the charging boxes to discharge the scrap into the furnace.

However, the invention also has the advantage of working on the basis of a storage system. Thus, in accordance with another feature of the invention, it is preferable to assign, to the charging box conveying trolley, at least one charging box receiving car or charging car moving along the furnace row. If only a single charging box carrying trolley track is available, a travelling charging machine provides the possibility of moving from furnace to furnace and charging furnaces whenever necessary.

The charging box receiver, which brings the charging boxes into the range of the charging opening or mouth of the furnaces, can also be eliminated in accordance with a further feature of the invention. In accordance with this further feature, the cutout or opening in the wall of the furnace hall is designed to have a length corresponding to the length of a furnace row and to receive a crane travelling parallel to the furnace row, the trolley suspending the charging boxes moving on this crane transversely relative to the scrap depot. During the transverse movement of a trolley suspending a scrap charging box, the crane can run in a longitudinal direction into operative relation with a furnace which is then to be charged. With this arrangement, any furnace can be selected and charged. Furthermore, in this arrangement, the charging boxes may be inserted, before the furnaces, into a stationary charging machine. Hereto, it is possible to work with the delayed scrap feed adapted to the furnace process.

While the tracks for the slag car are arranged beneath the furnace platform, as usual, in accordance with another feature of the invention, the tracks for the hot metal cars and for the steel slag cars are arranged on the steel withdrawal or tapping side of the furnace row. The melting furnaces can thus be arranged along the hall wall even closer to the scrap depot, so that the scrap depot and the furnace row are arranged even closer to each other. The basic concept of this latter measure, in its broadest form, leads to direct charging of the scrap into the furnaces from the scrap depot.

The crane used in any of the above-mentioned embodiments of the invention can be guided in any desired form. A particularly favorable arrangement, in accordance with another feature of the invention, is to guide the crane inside the furnace hall, and throughout the length of the opening in the wall of the furnace hall, on rails and the like. In this way, the tilting moment of the position of the trolley carrying the charging box, above the scrap depot, can be readily compensated.

Also, in accordance with the present invention, the crane can be improved by being provided with one or more openings in the direction of movement of the trolleys carrying the charging boxes. The support on the edge of the cutout of the wall of the furnace hall can thus be either a single frame or a number of smaller frames through which the trolleys run. Overall, there is a good connection between the running and support wheel portions of the crane.

An object of the present invention is to provide an improved arrangement of a steel making plant with respect to a scrap depot and furnaces arranged in a furnace hall.

Another object of the invention is to provide such an arrangement in which the furnaces are arranged along a wall of the furnace hall and with their charging sides facing the scrap depot.

A further object of the invention is to provide such an arrangement involving better utilization of the available area as well as an increase in output.

Yet another object of the invention is to provide such an arrangement resulting in a simplification of the means for conveying scrap from a scrap depot to the furnaces.

A further object of the invention is to provide such a steel plant arrangement in which the loads and demands on the crane in the furnace hall and the crane in the scrap depot are essentially balanced.

Still another object of the invention is to provide such a steel plant arrangement in which at least one track for a trolley suspending a scrap charging box extends between the scrap depot and the furnace hall through a cutout in a wall of the hall.

A further object of the invention is to provide such an arrangement in which the necessity for a scrap ferry or other like conveying means, is obviated.

A further object of the invention is to provide such a steel plant arrangement in which the opening in the hall of the furnace wall corresponds in length with the length of a row of furnaces, with a crane traveling along this opening parallel to the furnace row, box suspending trolleys moving on the crane transversely relatively to the scrap depot.

Another object of the invention is to provide such a steel plant arrangement in which tracks for hot metal cars and steel slag cars are arranged on the steel withdrawal side of the row of furnaces beneath the furnace platform.

For an understanding of the principles of the invention, reference is made to the following description of a typical embodiment thereof as illustrated in the accompanying drawings.

DESCRIPTION OF THE PREFERRED EMBODIMENT

While the invention will be described with respect to a steel plant utilizing steel converters, it will be readily understood that the invention is equally applicable to a steel plant producing steel by any other type of melting furnace.

Figure 1:
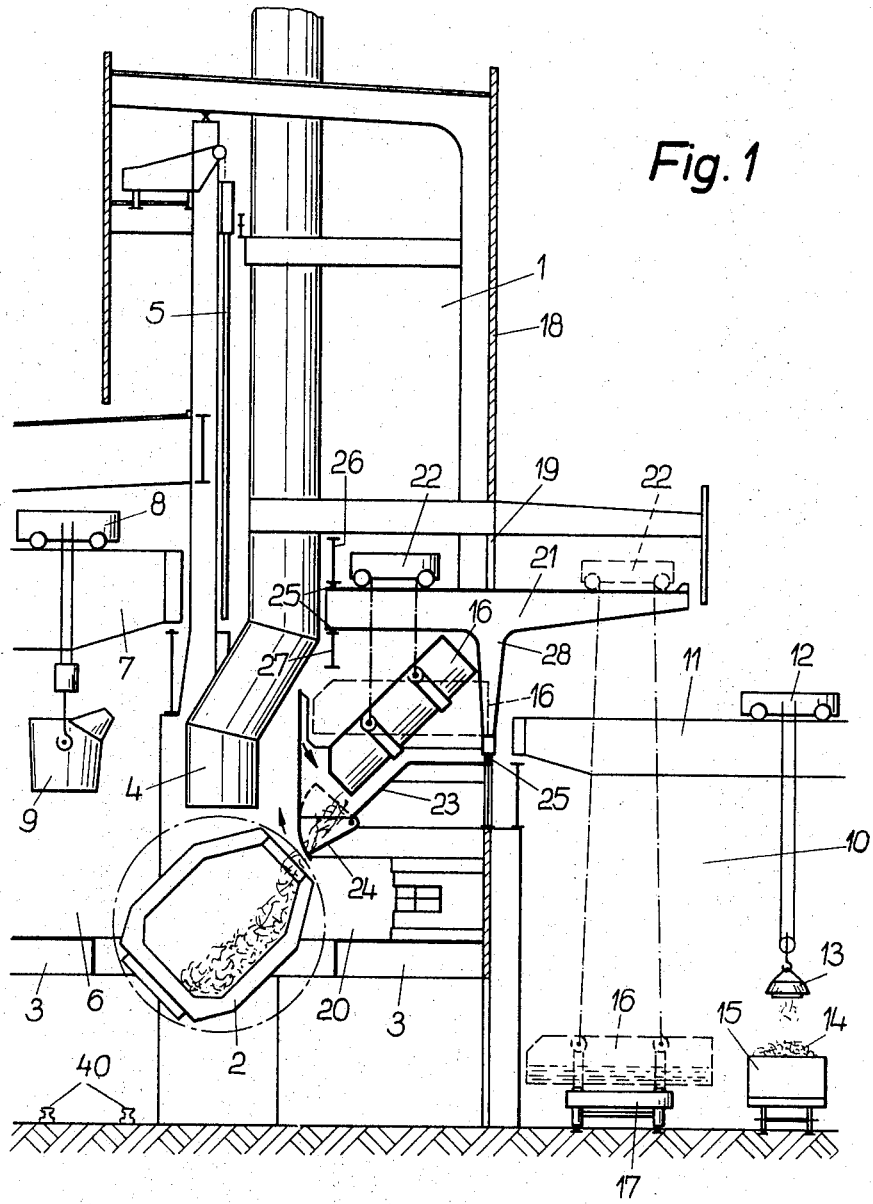
FIG. 1 is a vertical sectional view through the furnace hall of a steel plant having an adjacent scrap depot, as seen in the direction along a row of furnaces.
Figure 2:
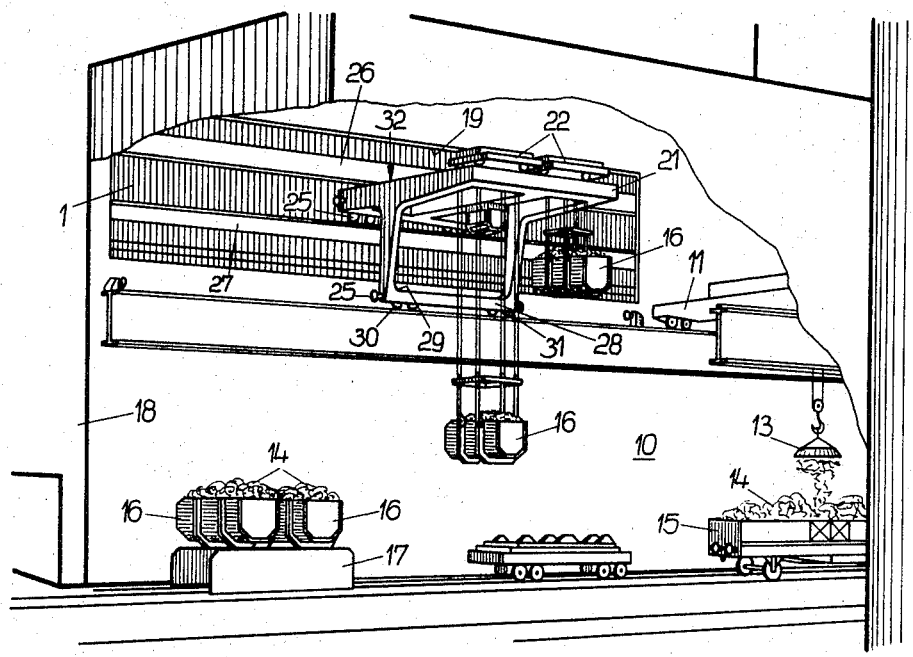
FIG. 2 is a perspective view, partly broken away, looking from the scrap depot toward the furnace row behind the wall of the furnace hall.

As seen in FIGS. 1 and 2, the steel plant includes a converter or furnace hall 1 having converter furnaces 2 arranged in series in a row extending along and at the level of a platform 3. Above each individual furnace 2, there are arranged a smoke flue 4 with a blow lance 5. On the steel withdrawal side 6 of the furnace row, there is arranged a hot metal transport crane 7, on whose trolley 8 there is suspended a hot metal ladle 9, and rails 40, for hot metal cars and steel slag cars, are also arranged on the steel withdrawal side 6 of the furnace row.

A scrap depot 10 is arranged next to converter hall 1. Scrap 14 is delivered from railroad cars 15 into scrap charging boxes 16 through medium of a crane 11 having a trolley 12 and a magnet 13. Several such scrap charging boxes 16, supported on rests 17, are at least partially filled with the scrap 14.

A wall 18 of furnace hall 1 separates the furnace hall from the scrap depot 10, and has an opening or cutout 19 which faces the charging sides of the furnaces in the furnace row 2. A crane 21, with one or more box suspending trolleys 22, is movable in this cutout or opening 19 in wall 18. The position of trolleys 22, when in the scrap depot, is indicated in broken lines, and the position of trolleys 22, when in the furnace charging position, is indicated in solid lines. The two positions of the scrap boxes 16, when suspended from the trolleys 22, are illustrated in the same manner as the trolleys 22 are illustrated. Some of the box trolleys 22 are particularly apparent in FIG. 2, as are some of the scrap boxes 16 positioned on the rests 17.

The scrap boxes 16 carried by the trolleys 22 discharge their contents into a stationary chute 23, having a special trapdoor or valve 24, a respective chute 23 with its associated control 24 being assigned to each furnace. The details of the chutes 23 and their controls 24 form the subject matter of a separate invention and thus will not be described in detail with respect to the present invention.

In the position of trapdoor or valve 24 as shown in FIG. 1, the current of scrap parts 14 flows into a furnace 2. Crane 21 is guided, as indicated at 25, by means of wheels engaging rails. The crane is further guided, inside converter hall 1, and on the hall frame, by means of the supports 26 and 27.

As can be best seen from FIG. 2, frame 28 of crane 21 is formed with a large opening 29. The wheel sets 30 and 31 are stably mounted on frame 28, as are also the trolley tracks 32 on top of the crane.

The invention can take many different forms. For example, it is possible to design the crane 21 in a different manner, in addition to which a rotation gear can be assigned to each box trolley 22. Thus, the invention, in its broadest aspects, contemplates all similar measures for shortening the path of travel of the scrapboxes from a scrap depot to the charging sides of furnaces in a furnace hall.

What is claimed is:

1. In a steel making plant including melting furnaces, a scrap depot, charging boxes to receive the scrap, and conveyor means including crane trolleys for conveying the charging boxes into the charging ranges of respective furnaces, the improvement comprising, in combination, a furnace hall; a wall separating said furnace hall from said scrap depot; said furnaces being arranged in a row in said furnace hall, with their charging sides facing toward said scrap depot; said wall having at least one opening therethrough; at least one crane trolley track extending through said opening between said hall and said scrap depot; and a trolley on each trolley track arranged to transport a charging box through said wall opening between said scrap depot and said furnace hall.

2. In a steel making plant, the improvement claimed in claim 1, in which said furnaces are arranged in a row extending along said wall, said opening in said wall having a length corresponding to the length of said row of furnaces; a crane mounted for movement parallel to said row of furnaces throughout the length of said opening; said crane having said crane trolley track and said crane trolley mounted thereon for movement transversely of the direction of movements of said crane.

3. In a steel making plant, the improvement claimed in claim 1, in which tracks for hot metal cars and steel slag cars are arranged to extend along the steel withdrawal sides of the furnaces in said row.

4. In a steel making plant, the improvement claimed in claim 3, in which said crane is guided on rail means within said furnace hall and rail means extending along said wall in said opening therein.

5. In a steel making plant, the improvement claimed in claim 4, in which said crane includes a support frame having at least one passage therethrough opening in the direction of movement of the crane trolleys between said scrap depot and said furnace hall.

6. In a steel making plant, the improvement claimed in claim 5, in which said crane includes a crane trolley track supporting frame component extending in opposite directions from said wall into said furnace hall and into said scrap depot.

References Cited
UNITED STATES PATENTS 2,836,309    5/1958    McFeaters            214—18
3,093,253    6/1963    McFeaters et al.       214—18

ROBERT G. SHERIDAN, Primary Examiner

U.S. Cl. X.R.

266—13